(12) United States Patent
Korneev

(10) Patent No.: US 7,529,151 B2
(45) Date of Patent: May 5, 2009

(54) TUBE-WAVE SEISMIC IMAGING

(75) Inventor: Valeri A. Korneev, LaFayette, CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 11/058,985

(22) Filed: Feb. 15, 2005

(65) Prior Publication Data
US 2006/0034152 A1 Feb. 16, 2006

(51) Int. Cl.
*G01V 1/42* (2006.01)
(52) U.S. Cl. .............................. 367/31; 367/27; 367/57; 181/106
(58) Field of Classification Search ................. 367/25, 367/27, 31, 37, 57, 32; 181/106, 122, 105
See application file for complete search history.

(56) References Cited

U.S. PATENT DOCUMENTS

| | | | |
|---|---|---|---|
| 4,354,381 A | | 10/1982 | Medlin et al. |
| 4,683,557 A | * | 7/1987 | Willis ........................... 367/57 |
| 4,715,019 A | | 12/1987 | Medlin et al. |
| 4,742,495 A | | 5/1988 | Medlin et al. |
| 4,856,614 A | | 8/1989 | Arens et al. |
| 4,890,687 A | * | 1/1990 | Medlin et al. ............... 181/106 |
| 4,962,489 A | | 10/1990 | Medlin et al. |
| 4,993,001 A | | 2/1991 | Winbow |
| 5,042,611 A | | 8/1991 | Howlett |

(Continued)

FOREIGN PATENT DOCUMENTS

WO    WO 2005/017560 A3    2/2005

OTHER PUBLICATIONS

Mo, Le-Wei. "Analysis and attenuation of tube waves: in crosswell seismic surveys." STP vol. 5, 1994 Annual Report. Stanford Wave Physics Lab.*

(Continued)

*Primary Examiner*—Jack W. Keith
*Assistant Examiner*—Scott A Hughes
(74) *Attorney, Agent, or Firm*—Fulbright & Jaworski LLP

(57) ABSTRACT

The detailed analysis of cross well seismic data for a gas reservoir in Texas revealed two newly detected seismic wave effects, recorded approximately 2000 feet above the reservoir. A tube-wave (150) is initiated in a source well (110) by a source (111), travels in the source well (110), is coupled to a geological feature (140), propagates (151) through the geological feature (140), is coupled back to a tube-wave (152) at a receiver well (120), and is and received by receiver(s) (121) in either the same (110) or a different receiving well (120). The tube-wave has been shown to be extremely sensitive to changes in reservoir characteristics. Tube-waves appear to couple most effectively to reservoirs where the well casing is perforated, allowing direct fluid contact from the interior of a well case to the reservoir.

15 Claims, 7 Drawing Sheets

U.S. PATENT DOCUMENTS

| | | | |
|---|---|---|---|
| 5,144,590 A * | 9/1992 | Chon | 367/57 |
| 5,170,018 A * | 12/1992 | Potier | 181/101 |
| 5,331,604 A | 7/1994 | Chang et al. | |
| 5,481,501 A * | 1/1996 | Blakeslee et al. | 367/57 |
| 5,740,124 A | 4/1998 | Chunduru et al. | |
| 6,327,538 B1 | 12/2001 | Chin | |
| 6,456,566 B1 | 9/2002 | Aronstam | |
| 6,467,542 B1 | 10/2002 | Kostrov et al. | |
| 6,591,193 B2 | 7/2003 | Krebs et al. | |
| 6,795,373 B1 | 9/2004 | Aronstam | |
| 6,842,400 B2 | 1/2005 | Blanch et al. | |
| 7,046,581 B2 * | 5/2006 | Calvert | 367/57 |

OTHER PUBLICATIONS

Wu, et al. "Borheole seismic modeling with inclusion of tube waves and other tube-wave-related arrivals." SEG Technical Program Expanded Abstracts, 2003.*

Robert E. Sheriff, "Stoneley wave—definition," Encyclopedic Dictionary of Exploration Geophysics, 4th ed., Society of Exploration Geophysicists (Tulsa, OK USA), p. 337, (Aug. 1, 2002).

Robert E. Sheriff, "body wave—definition," Encyclopedic Dictionary of Exploration Geophysics, 4th ed., Society of Exploration Geophysicists (Tulsa, OK USA), p. 38, (Aug. 1, 2002).

* cited by examiner

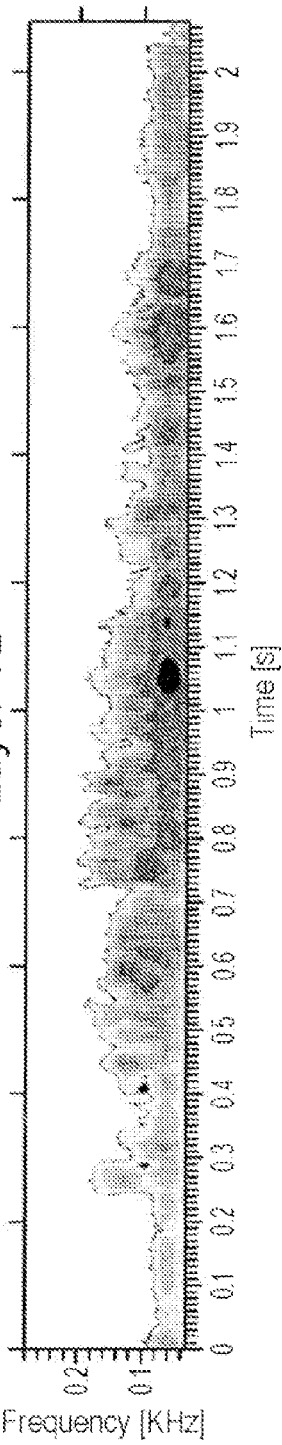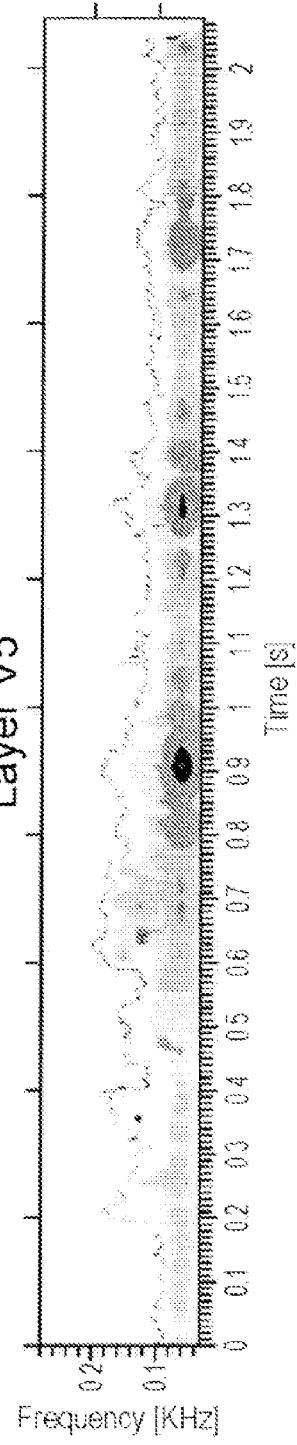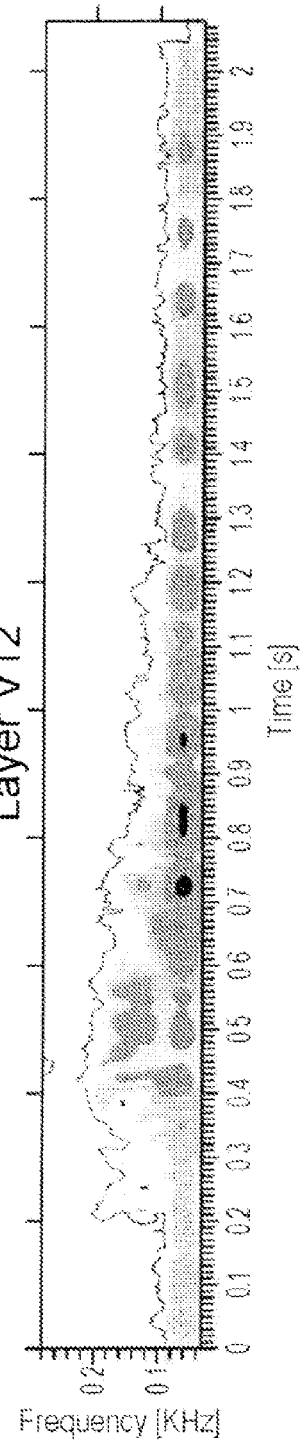
FIG. 4A Layer V2
FIG. 4B Layer V5
FIG. 4C Layer V12

Stacked cross-correlation of data and the fast tube wave $W_1$

TUBE-WAVE SEISMIC IMAGING

STATEMENT REGARDING FEDERAL FUNDING

This invention was made with U.S. Government support under Contract Number DE-AC03-76SF00098 between the U.S. Department of Energy and The Regents of of the University of California for the management and operation of the Lawrence Berkeley National Laboratory. The U.S. Government has certain rights in this invention.

CROSS REFERENCE TO RELATED APPLICATIONS

This application claims priority to co-pending international patent application number PCT/US2004/026356 filed Aug. 13, 2004, entitled "Tube-wave Seismic Imaging Method and Apparatus", which in turn claims priority to U.S. provisional patent application No. 60/495,586 filed Aug. 15, 2003, entitled "Tube-wave Seismic Imaging Method and Apparatus", both of which are hereby incorporated by reference.

REFERENCE TO A COMPUTER PROGRAM

Not Applicable.

BACKGROUND OF THE INVENTION

1. Field of the Invention

The present invention relates to seismic imaging, and more particularly to seismic imaging with tube-wave excitation and detection.

2. Description of the Relevant Art

U.S. Pat. No. 6,591,193, entitled "Method and apparatus for acquiring offset checkshot survey data using tube-wave conversion", incorporated herein by reference, discloses a method for acquiring offset checkshot survey data for the subsurface region in the vicinity of a fluid-filled well, said method comprising the steps of: deploying an acoustic receiver at a known depth in said well; determining the tube-wave traveltime from said acoustic receiver to a tube-wave conversion point located in said well; generating a seismic signal at a source location that is laterally offset from said well; measuring the total traveltime of said seismic signal along a ray path from said source location to said tube-wave conversion point and then through said fluid to said acoustic receiver; and subtracting said tube-wave traveltime from said total traveltime to determine the seismic signal traveltime from said source location.

Tube-waves have traditionally been regarded as a source of high amplitude noise in borehole seismic data, and great effort typically goes into their suppression and elimination from recordings. Tube-waves have very large amplitudes and can propagate long distances without substantial decay. A tube-wave is an interface wave for a cylindrical interface between two media, typically a borehole fluid and surrounding elastic rock. Borehole waves were described by Lamb and were observed in the early twentieth century, as summarized by White. Using trapped (or guided) mode analysis, the classic tube-wave can be seen as the lowest order trapped mode. Higher order modes may be generated depending on wave propagation material properties and source frequency. The fundamental mode is usually referred to as a Stoneley wave. Some work has been done to analyze tube-wave attributes in order to evaluate rock properties. The conversion of tube-waves into a coal seam trapped modes was reported by Albright and Johnson.

BRIEF SUMMARY OF THE INVENTION

This invention provides for a method for seismic imaging using tubewaves, the method comprising the steps of: a) transmitting an input tube-wave waveform down a transmitter borehole; b) receiving a signal tube-wave waveform from a receiver borehole; and c) digitally processing said signal tube-wave waveform to produce a seismic image of a geological mass disposed between said transmitter and receiver boreholes.

The method above may further comprise the step of coupling either or both of said borehole tubewaves to said geological mass.

The methods above may preferably be used wherein said receiving step signal tube-wave waveform occurs at least 3 times later than the arrival of an initial P wave through said geological mass in traditional seismic imaging.

The method tube-wave analysis and seismic image generation steps above may further comprise the step of controlling an oil or gas field disposed in said geological mass based on said seismic image.

An apparatus for seismic imaging using tubewaves may be constructed that implements the methods described above.

In an alternate embodiment, an apparatus for seismic imaging using tubewaves as described above may be constructed, the apparatus comprising: a) a transmitter borehole for transmitting an input tube-wave waveform; b) a receiver borehole for receiving a signal tube-wave waveform; and c) a seismic image of a geological mass disposed between said transmitter and receiver boreholes produced by digitally processing said signal tube-wave waveform.

The apparatus above may further comprise: a) a transmitter tube-wave converter, b) wherein said transmitter tube-wave converter converts said input tube-wave waveform and couples said input tube-wave waveform to said geological mass disposed between said transmitter and receiver boreholes.

The apparatus above may still further comprise: a) a receiver tube-wave converter, b) wherein said receiver tube-wave converter converts: i) a wave in said geological mass disposed between said transmitter and receiver boreholes, ii) wherein said wave has originated from said input tube-wave waveform coupled to said geological mass disposed between said transmitter and receiver boreholes.

BRIEF DESCRIPTION OF THE SEVERAL VIEWS OF THE DRAWINGS

The invention will be more fully understood by reference to the following drawings, which are for illustrative purposes only:

FIGS. 4A-C are stacked frequency spectra, as functions of time, for the traces respectively recorded in V2, V5 and V12 layers.

DETAILED DESCRIPTION OF THE PREFERRED EMBODIMENT

Abstract

Figure 1:
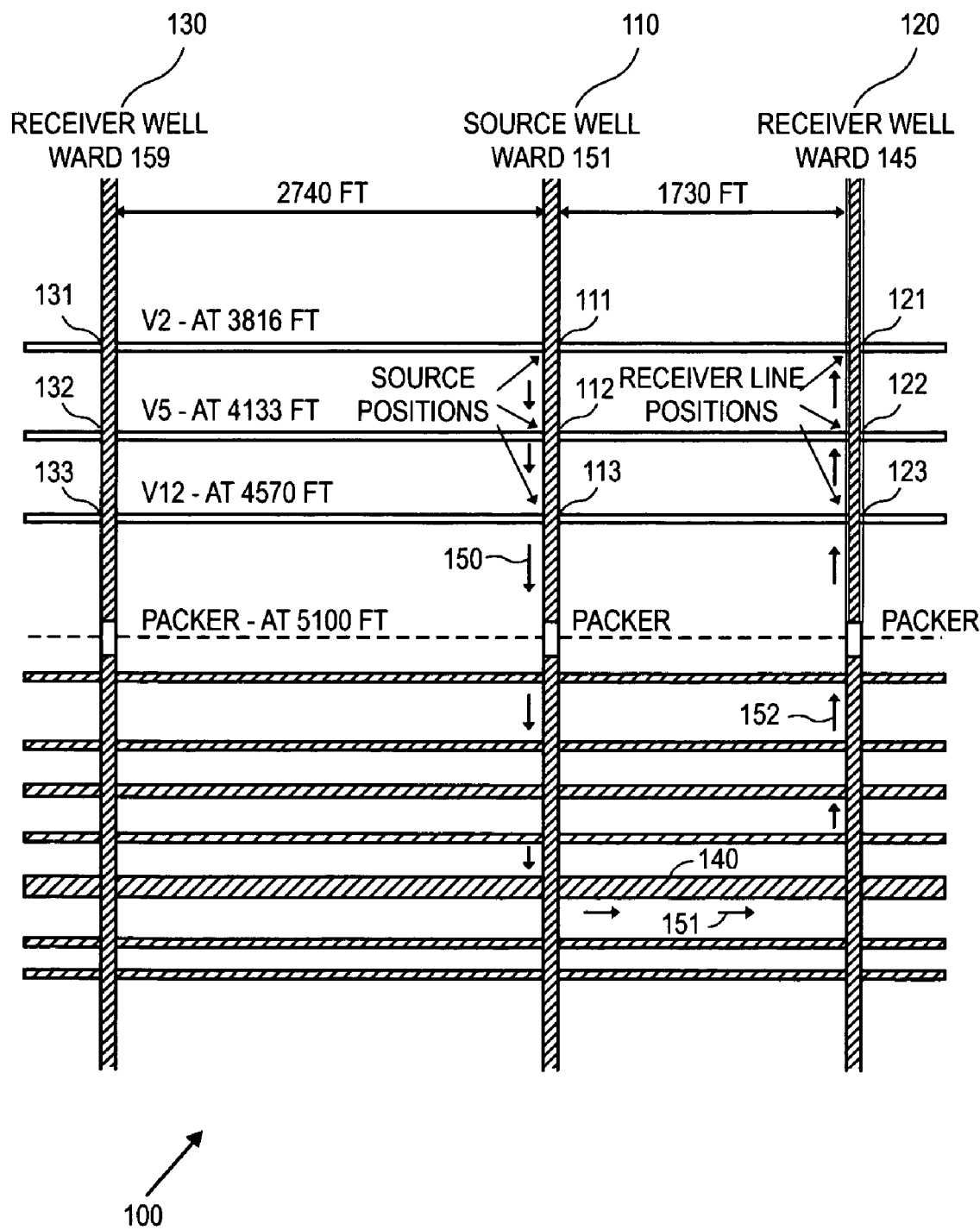
FIG. 1 depicts the data acquisition scheme used for the Stratton cross well experiment, where: sources and receivers were placed at the upper low-velocity layers V2, V5 and V12; the reservoir layers are below the depth of 5100 ft; and all the wells had packers.

The analysis of crosswell seismic data for a gas reservoir in Texas revealed two newly detected seismic wave effects, recorded 2000 feet above the reservoir. The first seismic effect is that the dominant late phases on the records are the tube-waves generated in the source well and later converted into laterally propagating waves through the reservoir in gas/water saturated layers, which convert back to tube-waves in the receiver well. The tube-waves in the receiver well may be detected using traditional seismic equipment. The tube-wave train showed good correlation with multilayered reservoir zone structure, suggesting that the recorded wave field has strong dependence on the reservoir parameters. The second seismic effect is that the recorded field is composed of multiple, relatively low-velocity, tube-waves. The modeling results suggest that imperfect cementation is the likely cause of this phenomenon.

Introduction

Tube-waves are traditionally regarded as a source of high amplitude noise in borehole seismic data. Substantial effort typically goes into tube-wave suppression and elimination from recordings. Tube-waves have very large amplitudes and can propagate long distances without substantial decay. A tube-wave is an interface wave for a cylindrical interface between two media, typically a borehole fluid and surrounding elastic rock. Borehole waves were described by Lamb and were observed in the early twentieth century, as summarized by White. Using trapped (or guided) mode analysis, the classic tube-wave can be seen as the lowest order trapped mode. Higher order modes may also be generated depending on material properties and source frequency. The fundamental mode is typically called a Stoneley wave in geophysical parlance. Limited work has been done to analyze tube-wave attributes in order to evaluate rock properties. The conversion of tube-waves into a coal seam trapped modes was reported by Albright and Johnson.

Stratton Field Experiment

The Stratton field experiment was designed in order to experimentally demonstrate the transmission and detection of guided waves in low-velocity sedimentary layers. The details of data acquisition, processing and low-velocity bed continuity study results can be found in readily available literature. The objective of the Stratton field project was to establish the feasibility and benefit of using interwell guided seismic waves for the characterization of Gulf Coast gas reservoirs. Target zones were selected based on geological markers, seismic reflectors, and well logs from the upper Frio Formation at the Stratton gas field. It was selected because it is one of the most extensively studied and well-documented producing oil and gas fields on the Gulf Coast.

The Stratton field consists mainly of sandstones and shales of the Frio Formation with velocity contrasts on the order of 10% to 20%. Three low-velocity intervals were identified, from top (closest to the surface) to bottom (deepest), as the V2, V5, and V12 shale zones, and were recognizable in all the wells.

Referring now to FIG. 1, three wells are diagrammatically indicated 100, which are the wells used to conduct the interwell logging experiments and are located in almost the same vertical plane. The data were collected in the receiver wells Ward 159(130) and Ward 145 (120), while sources were placed in the well Ward 151 (110) between the receiver wells at three positions, corresponding to the centers of target layers V2(111) at 3816 ft (forming data set A145), V5 (112) at 4133 ft (forming data set B145) and V12 (113) at 4570 ft (forming data set C145). The source was Texaco's multiple air gun system, a tool comprised of three air guns spaced 27 inches apart, which are fired simultaneously with each shot. Receivers were also clustered about the V2 (131), V5(132), and V12 (133) locations in Ward 159 with sensors at separations described further below.

A tube-wave (150) is initiated in a source well (110) by a source (111), travels in the source well (110), is coupled to a geological feature (140), propagates (151) through the geological feature (140), is coupled back to a tube-wave (152) at a receiver well (120), and is and received by receiver(s) (121) in either the same (110) or a different receiving well (120).

The guided-wave signatures were related to targets arriving in the 0.6-0.8 s time interval. The observed seismic data indicate the presence of trapped energy in low velocity shale markers between wells 145 and 151. Guided waves in the form of leaky modes are excited, transmitted, and detected in the low-velocity shale markers at a well separation of 1730 ft (527 m) (not shown in FIG. 1). Dispersion analysis, modeling, frequency-amplitude depth curves, well logs, and lithological information all support the results. Due to an unusually large interwell distance in the crosswell system the overall data quality was poor. Just two shots were used for stacking the data because the release of air bubbles into the borehole fluid rapidly reduced the coupling between air gun source and the formation, producing about 40% of elastic wave energy compare to a previous shot. The strongest phases in the records, which were arriving later then 0.8 s were not interpreted at the time, since they were out of the scope of the experiment goals.

Data sets

The three data sets A145, B145 and C145 consist of 46 records each from the receivers positioned across the target layers. The upper 7 receivers had a 10 ft spacing interval, while the next 33 receivers had 2 ft spacing and the lower 6 receivers again had 10 ft spacing interval. The whole length of the receiver line for the well Ward 145 (120) was 170 ft and had the best data quality compared to the data sets A159, B159 and C159 obtained in the well Ward 159, where 3-component geophones were used. The recorded signal frequency was up to 300 Hz in the well Ward 145 and up to 100 Hz in the far well Ward 159. The Ward 159 data sets had 22 receiver positions with 5 ft spacing covering 115 ft of depth around each target layer.

While geophones were used in the cemented well Ward 159, the attempt to cement the space around the casing in the well Ward 145 failed, with the result that there was no good bonding between the casing and the formations above 5100 ft in that well. The hydrophone recording in that well had a better signal-to-noise ratio compared to the other well, which is most likely the result of the smaller source-receiver distance.

Figure 2A:
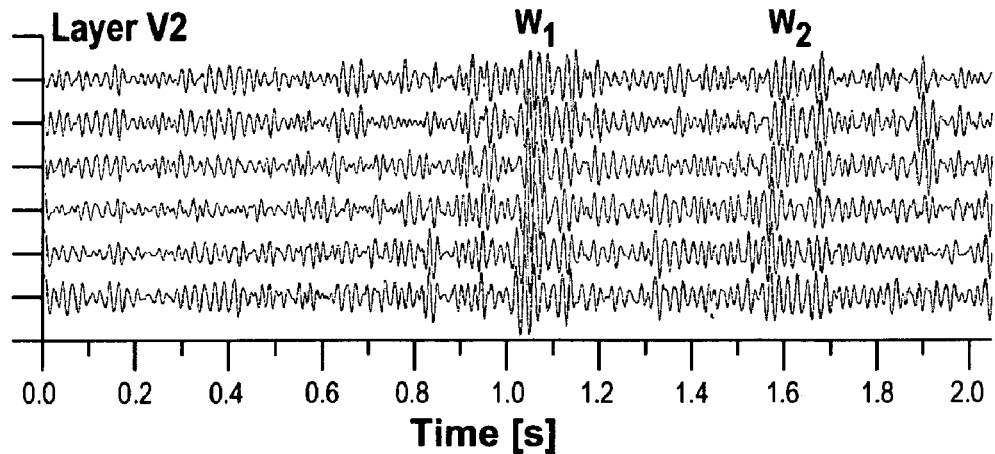
FIGS. 2A-C are single shot gathers in 50-100 Hz frequency band for the receiver well Ward 145, respectively showing that trace sets recorded in V2, V5 and V12 contain high amplitude slower arrivals (wavetrains) W1-W6.
Figure 2B:
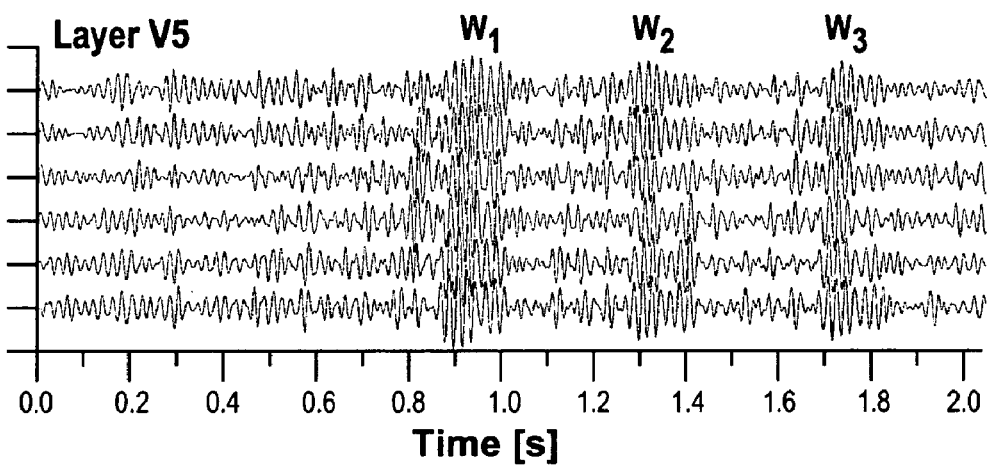
Figure 2C:
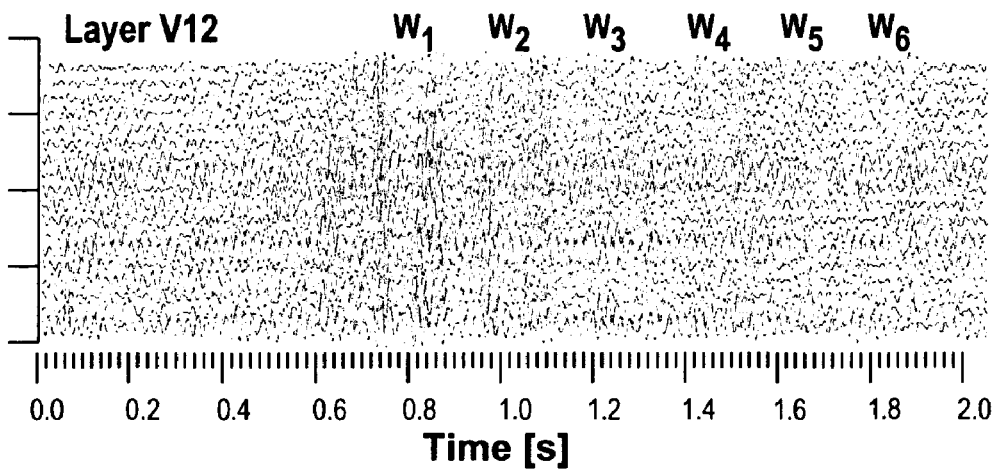
Figure 3A:
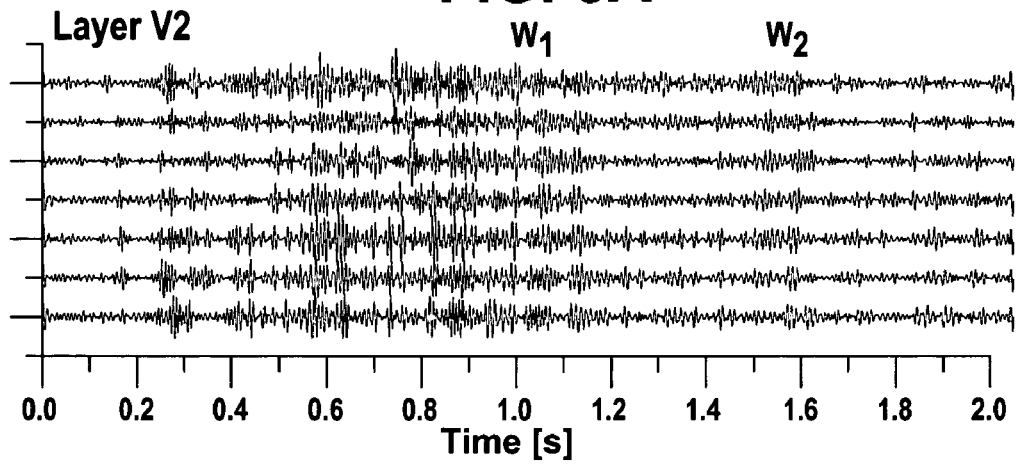
FIGS. 3A-C are respectively the same input data as was used for FIGS. 2A-C, but filtered at higher 100-160 Hz frequency band.
Figure 3B:
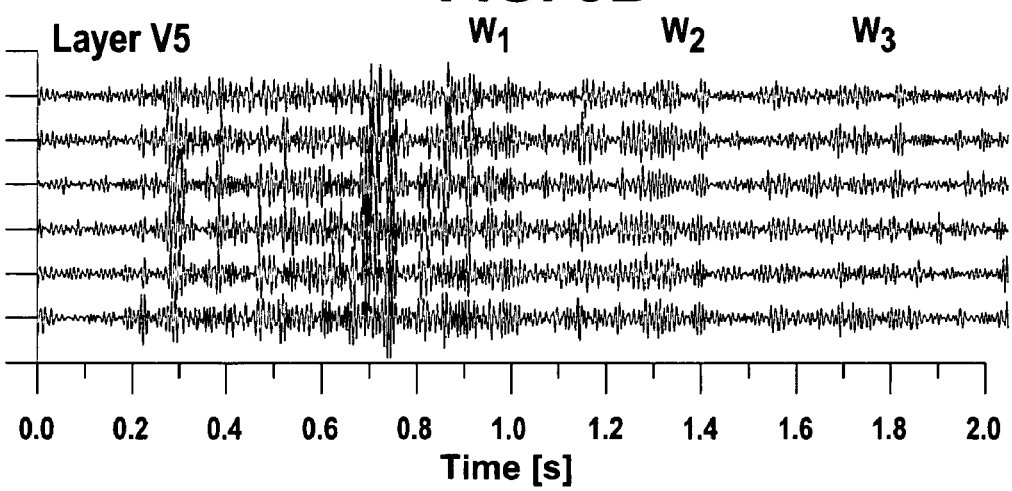
Figure 3C:
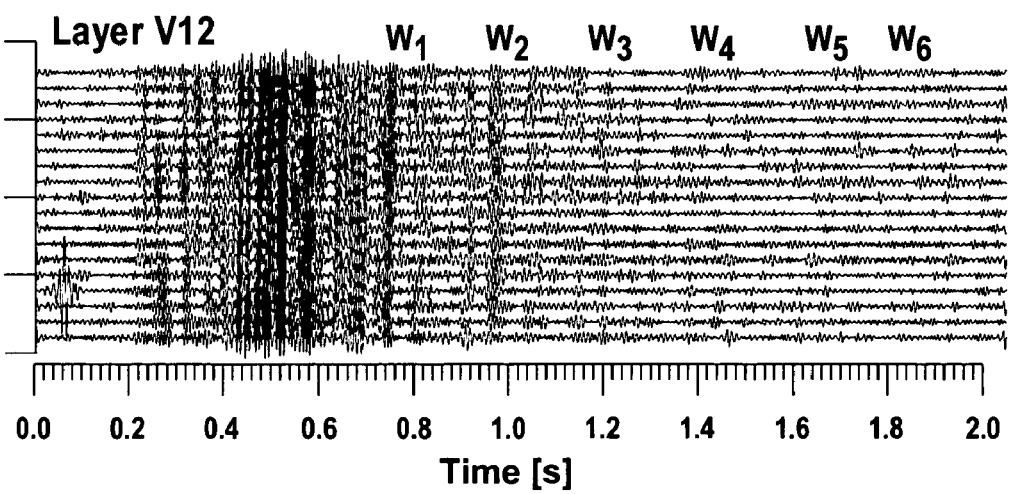

Referring now to FIGS. 2A-C, the low frequency (50-100 Hz) filtered traces are respectively shown for data sets A145, B145 and C145. The same data sets for the high frequency (100-160 Hz) band are respectively shown in FIGS. 3A-C. There is a presence of late high amplitude arrivals in the data, which is most pronounced at low frequencies. These arrivals are concentrated in separate wavetrains, which are denoted as $W_k$, where the integer index k=1, 2, . . . 6 corresponds to the order of arrival.

Data Processing

The interpretation of the strong late phases exemplified by those arriving in the 0.8-2.0 s intervals FIGS. 2A-C and FIGS. 3A-C are of particular importance. The relatively small travel time (0.2 s) for the direct P-wave arrivals suggests that the late phases belong to waves with long propagation paths and/or rather small velocities. This energy was clearly elsewhere, while the direct P-waves were arriving at 0.2 s. The apparent velocities of the strongest phases around the 1 s arrival time were estimated to be in the 1300-1500 m/s range, which correspond to propagating tube-waves.

Figure 5A:
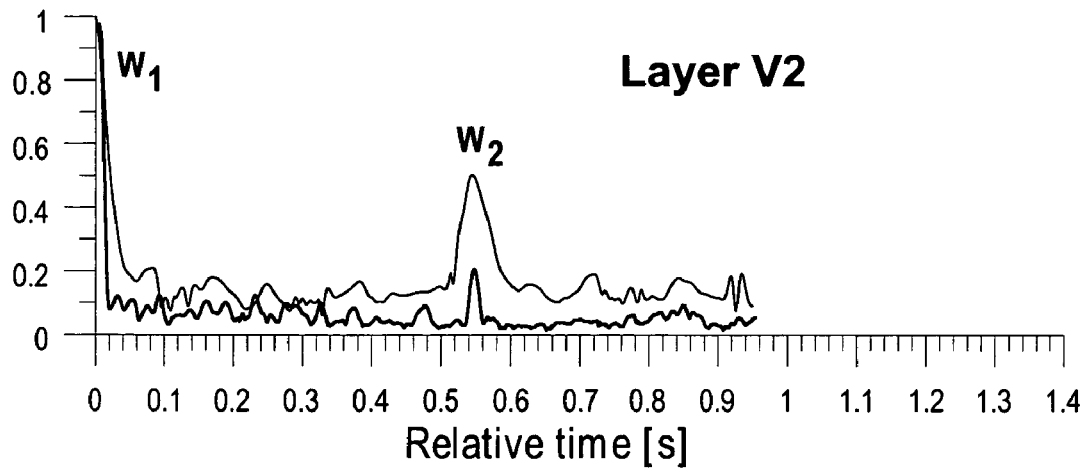
FIGS. 5A-C are stacked cross-correlations of traces with W1 waveform, where low band pass filtered (50-100 Hz, upper curves) and high band pass filtered (100-160 Hz, lower curves) data produce the same peak positions.
Figure 5B:
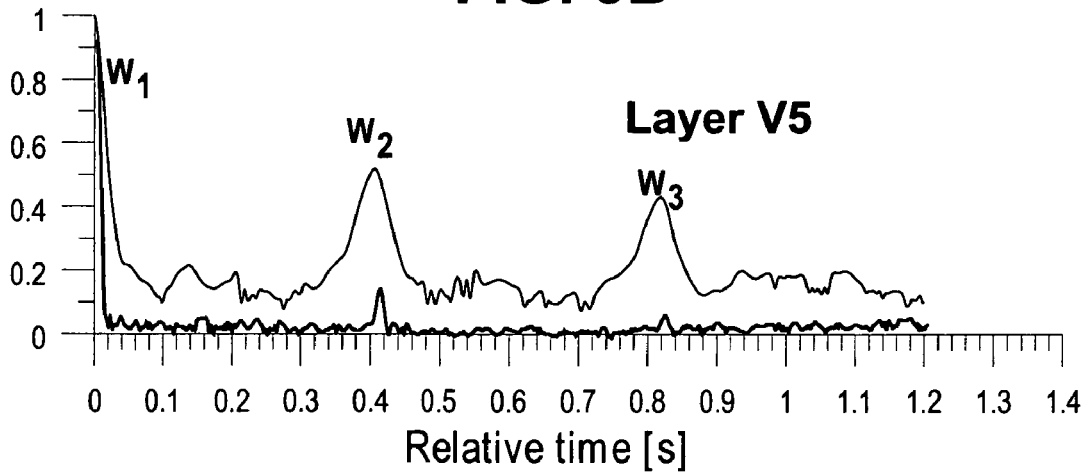
Figure 5C:
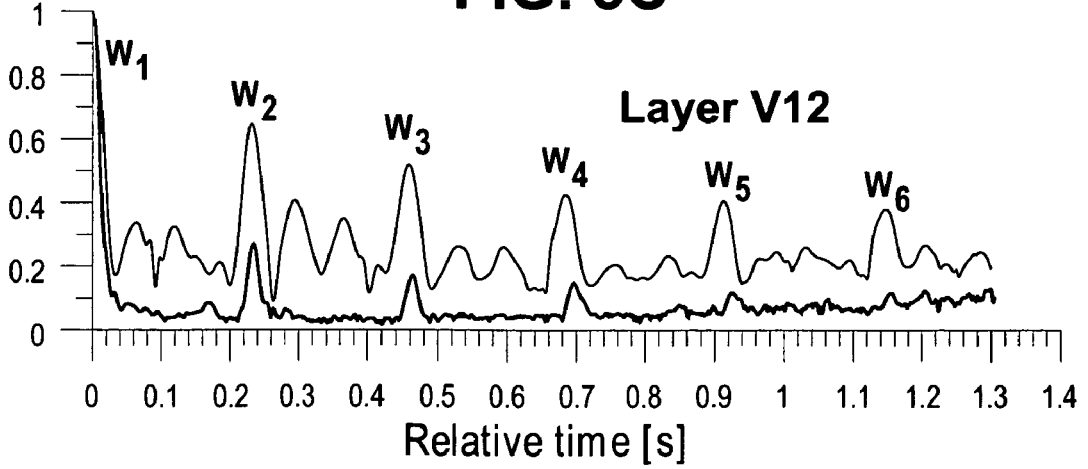

FIGS. 4A-C respectively show stacked amplitude spectra of traces computed with a moving 0.3 s time window for three (A145, B145, and C145) sets. The spectra show the existence of two dominant frequency ranges in the late arriving phases with central values of 60 and 110 Hz. The main features of the panels are the high amplitude wave trains in the 40-100 Hz interval. The late wave trains with highly similar waveforms are clearly seen from this data. The traces were cross-correlated with the corresponding first arriving wavetrain interval, which allowed the measurement of the main peak travel times with better than 0.01 s accuracy. This interval was 0.7-1.3 s for A145, 0.7-1.3 s for A145, and 0.7-1.3 s for A145 datasets. The high (90-100-200-220 Hz) and low (30-40-80-90 Hz) band-pass filtered data reveal practically the same results (FIG. 5), which suggests negligibly low dispersion in the frequency band under consideration. The measured travel times for the strongest central peaks are given below in Table 1 and represent upward propagating waves of varying velocities.

TABLE 1

Picked travel times [s] for the maximum energy phases.

| Receiving wells -> | Ward 159 | Ward 151 | | | | | |
|---|---|---|---|---|---|---|---|
| Recorded waves | Wave 1 | Wave 1 | Wave 2 | Wave 3 | Wave 4 | Wave 5 | Wave 6 |
| Layer V2 at 3816 ft | 1.17 | 1.055 | 1.605 | — | — | — | — |
| Layer V5 at 4133 ft | 1.04 | 0.92 | 1.32 | 1.75 | — | — | — |
| Layer V12 at 4570 ft | 0.86 | 0.73 | 0.965 | 1.19 | 1.115 | 1.64 | 1.875 |

The high degree of correlation between different wave trains $W_k$ allows us to assume a constant frequency-independent propagation velocity along the well. Evaluation of these velocities is done in several steps. First, the travel times obtained from well Ward 159 are used to determine the tube-wave velocity $v_c$ in the cemented wells, yielding $v_c$=1460 m/s. Then, the velocities $v_k$ of the first three k=1, 2, 3 wave-trains recorded in at least two of the target layers are determined from the equation $$\Delta t_{ij}^{(k)} = t_i^{(k)} - t_j^{(k)} = (h_i - h_j)(1/v_k + 1/v_c), \quad (1)$$

where $t_i^{(k)}$ are the recorded travel times for a wave k at a target layer 1, and $h_l$ is the depth of that layer. This allows us to evaluate the velocities for the three fastest waves and obtain the values $v_1$=1365 m/s, $v_2$=470 m/s, and $v_3$=288 m/s. In order to determine the depth of origin of slow wave generation, it is assumed that waves recorded in Ward 145 originated at the same depth $h_o$, and for any target layer i=1, 2, 3 the following equation can be used:

$$\Delta t_i^{(eq)} = t_i^{(e)} - t_i^{(q)} = (h_o - h_i)(1/v_e - 1/v_q) \quad (2)$$

where indexes e and q indicate one of three recorded waves. All five possible combinations of waves (since the layer A has just two recorded waves) give very close values averaging at $h_o$=5110 ft and varying within a 12 ft range. This value almost coincides with the 5115 ft depth of the well packer. In all of the following evaluations, the packer location is the origin of all tube-wave trains recorded in Ward 145. According to well records at depths below the packer Ward 145 has cementation, and therefore it is assumed that the tube-wave velocity at those depths is the same as for Ward 154 and Ward 159 and is equal to $v_c$=1460 m/s. Using this assumption, the velocities $v_e$ of the other three wave trains (k=4, 5, 6) can be estimated using the same equation (2). The results for all tube-wave velocity evaluations are shown in Table 2.

TABLE 2

| Tube-wave velocities [m/s]. | | | | | | |
|---|---|---|---|---|---|---|
| Cemented wells | Non cemented part above casing in Ward 151 | | | | | |
| Wave 1 | Wave 1 | Wave 2 | Wave 3 | Wave 4 | Wave 5 | Wave 6 |
| 1460 | 1365 | 470 | 288 | 207 | 162 | 132 |

Figure 6:
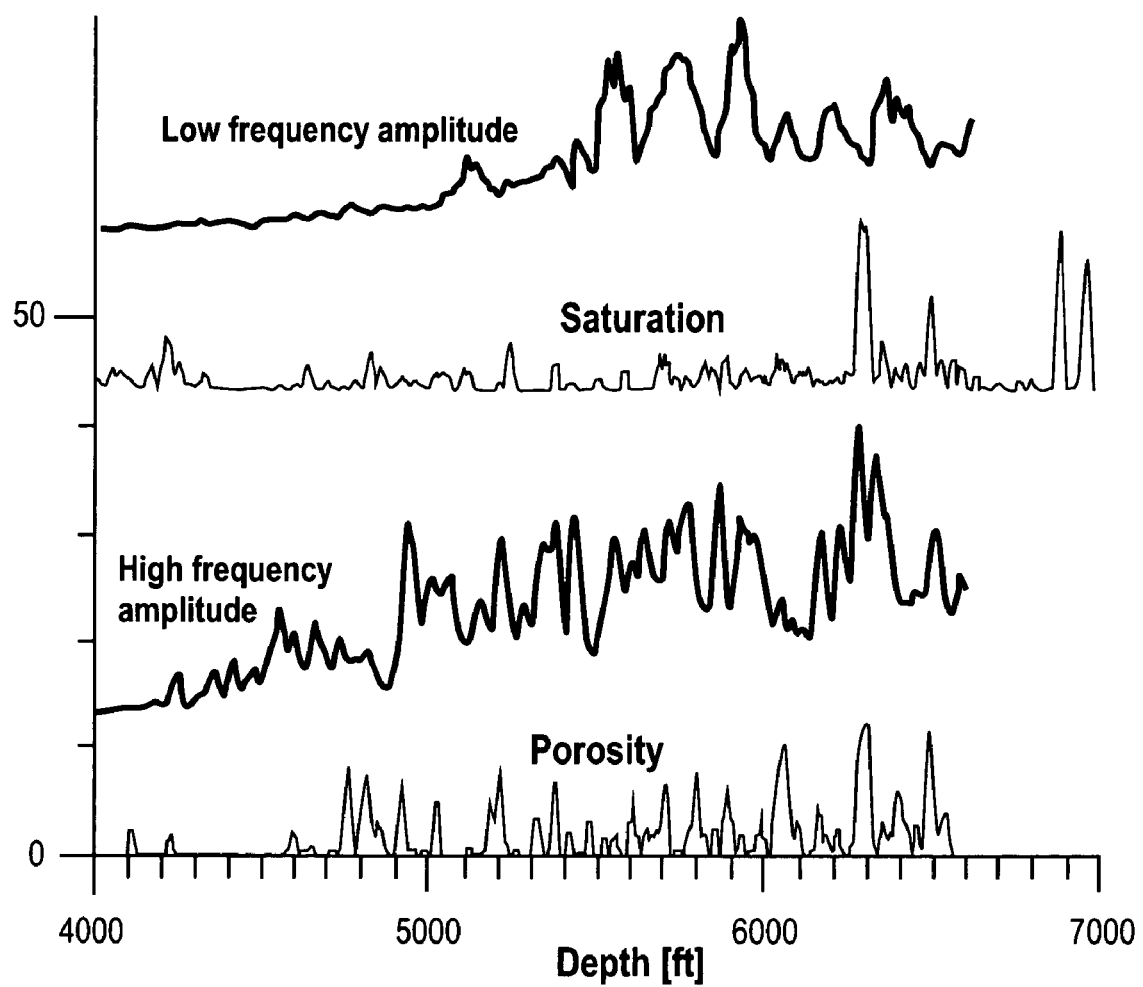
FIG. 6 shows a comparison of guided wave energy of the first train with porosity and saturation taken from well logs.

The almost perfect lateral homogeneity of the formation permits the interpretation of the wave propagation of late arrivals as consisting of three-leg paths. The wave propagates downward as a regular tube-wave, then converts into a horizontally propagating wave along some seismically conductive layer and after reaching the receiver well it propagates upwards, splitting into a set of at least six waves of different velocities at packer depth. The depth $h_g$ and velocity $v_g$ of this horizontal layer may be estimated by solving two equations of the form $$t_i^{(w)} = (2h_g - h_o - h_i)v_c + d_w/v_g + (h_o - h_i)/v_1, \quad (3)$$

where $t_i^{(w)}$ is the travel time of a first arriving tube-wave at both receiver wells (w=159, 145), and $d_w$ is the distance between source and receiver wells ($d_{159}$=2740 ft., $d_{145}$=1730 ft.). The fine layered structure of the formation makes it anisotropic for wave propagation. The horizontal propagation velocity in layer g can be expressed in the form $v_g = v_v \cdot a$, where $v_v$ is the mean velocity taken from log data and a is some unknown constant. Three independent estimates for each target layer i=A, B, C gave the values $h_g$=5717 ft. and a=0.63. After obtaining these estimates, equation (3) can be used to map the recorded seismic phases from the time to the depth scale. FIG. 6 shows a comparison of guided wave energy of the first train with porosity and saturation taken from well logs.

Tube-Wave Modeling

A solution for axial wave propagation in a layered cylinder is explored in order to explain the observed phenomena of tube-wave splitting. The solution is exact and expressed in form of an independent mode series with integer index m. It can be used for any layered model with cylindrical symmetry when the material parameters for each layer are homogeneous. The boundary conditions can be either welded or sliding, where just the normal stresses and displacements are continuous. The details of the solution are given below in Appendix A. For any given frequency $\omega$ and mode index m the tube-wave velocities $v_{tw}^{(m)}$ were found as the real roots of $\Delta_m(v_{tw}^{(m)},\omega)=0$, where $\Delta_m(v_{tw}^{(m)}, \omega)$ is the determinant of a corresponding boundary condition problem (see Appendix B below for a discussion of the Boundary Value Problem). The root search interval is bounded below 1500 m/s, the propagation velocity of compressional waves in water.

The primary purpose of the modeling is the explanation of the six different tube-wave propagation velocities found in the Stratton experiment data. The diameter of the drill bit for this well was 25 cm and the diameter of the steel casing was 5 mm. These values, as well as the known material parameters for water, steel casing and the outer rock formation were kept unchanged. The quality of bonding between the casing and the outer rock in receiver well Ward 145 is under investigation because this well is not cemented above the packer at 5100 ft. The well was drilled before 1980 and it is most likely that the space between the casing and the formation was filled by fragments of shale and sandstone as a result of sedimentation and accumulation of broken and washed out rock material. This material will be henceforth referred to as "gauge", implying that it represents a poorly consolidated, liquid saturated mixture of sand and shale that contains gas, as the formation has some gas bearing layers. Such formations are known to have very slow P- and S-wave propagation velocities.

Figure 7:
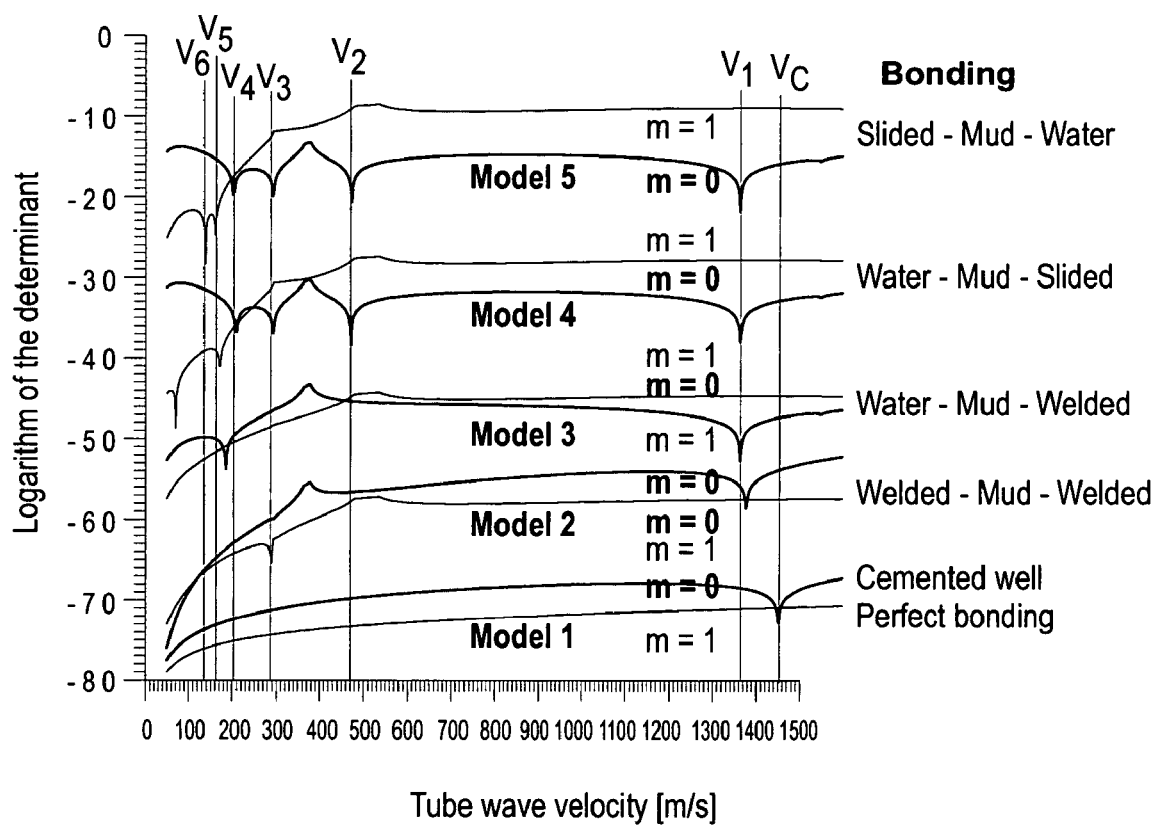
FIG. 7 show a logarithmic plot of determinants as function of velocity $V_{tw}$ at a frequency of 90 Hz frequency, where: notches indicate tube-wave propagation velocities, and vertical lines indicate the wave train velocities of W1-W6 measured in the field experiment. Each bonding set is represented by the fundamental m=0 mode (thick solid lines) and first m=1 mode (thin solid line). The parameters of model 4 gave the best fit.

Several different models were used in an attempt to match the observed tube-wave data, including different types of space fillings around the casing: all possible combinations of low velocity gauge, which had either welded or sliding contacts with adjacent layers, and could also have thin liquid intermediate skin layers that separate gauge from casing or rock. The material parameters and sizes of the models are given in Table 3. Roots were found for the first two harmonics m=0, 1. The results of these model computations suggest that the velocities of wave trains $W_2$ and $W_3$ are practically equal to the compressional and shear velocities of the gauge. This conclusion is supported by a typical value of $v_s/v_p$ ratio equal to 0.62 for these two waves, and also by a perfect fit for the fastest velocity of $W_1$. The thicknesses of the liquid layers had strongest impact on the velocities of $W_4$, $W_5$ and $W_6$, and were varied to find the best fit. The most interesting results for six out of the ten different models are presented in FIG. 7, and the models of the bonding are shown in Table 4.

TABLE 3

Parameters of layers for tube-wave modeling

| Material | Vp [m/s] | Vs [m/s] | Density [g/cm3] | Minimal radius [cm] | Thickness [cm] |
|---|---|---|---|---|---|
| Borehole fluid | 1550 | 0 | 0.95 | 0 | 7 |
| Steel casing | 5800 | 3000 | 8 | 7 | 0.6 |
| Fluid | 1550 | 0 | 0.96 | 7.6 | 0–1 |
| Gauge | 540 | 280 | 1.3 | 7.6–8.6 | 8.4–6.4 |
| Fluid | 1550 | 0 | 0.96 | 15 | 0–1 |
| Cement | 3600 | 1800 | 2.7 | 7.6 | 8.4 |
| Host rock | 3600 | 1800 | 2.7 | 16 | ∞ |

TABLE 4

Models of material properties between casing and rock used for tube-wave modeling

| Model 1 | Cement |
|---|---|
| Model 2 | Gauge |
| Model 3 | Water layer - Gauge |
| Model 4 | Gauge - Water layer |
| Model 5 | Gauge - Water layer - Gauge |

From these results it follows that only Model 4 (bolded above) provides a good fit for all velocities observed in the experiment. This model has sliding contact between casing and the gauge and 7 mm thick liquid skin layer separating the gauge from the host rock formation. All gauge-containing models show the fastest tube-wave velocity to be about 6% lower than in the cemented case (Model 1). Sliding-welded and welded-sliding contact models revealed just the main root for the fastest velocity. The sliding-sliding pair gave just two roots for $W_5$ and $W_6$, but these two roots were absent for the liquid skin containing models.

Discussion

The data were recorded at 2000 ft above the depleted gas reservoir. Overall the slow velocities of the tube-waves and the relatively large propagation distances explain why these waves were traveling 5 to 15 times longer than the direct P-waves. Standard cross-well surveys rely on first arriving phases for imaging and thus do not target tube-waves. The log data used for the comparison above were collected 20 years before the experiment and were obtained before the reservoir exploitation. At the time of the survey most of the gas bearing layers were depleted and gas had been replaced by water. Therefore, the comparison of tube-wave amplitudes and saturation data has a qualitative character indicating more the coincidence of peaks rather than their amplitude. It seems natural that the conversion of tube-waves is more effective in saturated rocks that reveal lower velocities and thus trap seismic energy. The mechanism of such conversion requires separate study.

The low values of the velocities chosen for gauge can be justified by the presence of trapped gas, as there were gas bearing layers above the packers. Even a small amount of gas present in the fluid saturated rock can dramatically decrease wave propagation velocities. It is also likely that the gauge was unconsolidated or poorly consolidated, which also contributed in lowering of wave propagation velocities within it.

The recorded travel times of the tube-waves consistently indicate that the well packer was the source of slow tube-wave generation. The cement packer represents a strong diffractor that converts the fundamental (fastest) tube-wave into a set of slower waves, exciting an additional fundamental mode (m=0) related to the gauge and two modes (m=1) related to the liquid layer. Such waves for parallel-layer models have been detected and explained by Chouet, and Ferrazini and Aki. They showed that waves propagating in a liquid layer between two adjacent half spaces can have arbitrarily low velocities, which depend on the thickness of the layer. In the case of the cylindrical model, the velocity of waves in the liquid layers showed detectable sensitivity to changes as low as 1 mm in the liquid layer thickness. It seems unlikely, though, that liquid skin layer model is an accurate representation of reality. It seems more likely that small pockets of water trapped in the gauge effectively act as a single thin layer. This is partially supported by the presence of low velocity tube-waves for the models containing a liquid layer on either side of the gauge.

Stratton Field Conclusions

Two main wave propagation phenomena were found in the Stratton field crosswell seismic experiment in addition to those found in a previous study of directly propagating guided waves. The first phenomenon is that the dominant late phases on the records are composed of tube-waves that are generated in the source wells and subsequently converted into waves propagating horizontally along the reservoir in gas/water saturated layers. The second phenomenon is that in a poorly bonded receiver well a phenomenon of tube-wave mode splitting was found, when six kinds of tube-waves were detected, each having a different velocity. As previously shown, the existence of these waves can be explained by the contact conditions of the borehole casing with the formation.

Because reservoir waves should be affected by reservoir properties (i.e. porosity, permeability, fracture density and orientation), monitoring based on use of these waves should allow the detection and interpretation of reservoir property changes near production boreholes. These effects can be used for the development of new and promising technology for the imaging and monitoring of underground gas, oil and water reservoirs.

Tube-wave Improvements

Subsequent tube-wave numerical modeling has indicated that well wall perforations themselves play key role in converting and diverting tube wave energy from the well into the geophysical formation. Other factors tested in the cased wells have generally been found to be relatively insignificant, and do not appear to contribute to tube-waves going into the layers when the tubes are not perforated. The role of perforations can be substituted or increased by placing wave enhancers at the reservoir depths. This is also supported by Stanford field data set, SEG 2003.

It was also discovered by modeling that when a perforated formation is made of fluid-saturated permeable rock (as opposed to caprock) then conversion and coupling of the energy from tube wave to horizontal energy is further enhanced. In other words, energy prefers to follow fluid-saturated formations to unsaturated ones.

It has also been determined that horizontally traveling signals consists of certain types of guided/channel waves propagating in low-velocity formations. This fact has far-reaching consequences, since it means that signals can travel thousands of feet with much less attenuation than conventional transmitted and reflected waves. Therefore it makes a realistic large cross-well distance possible for use in oil and gas deposits spanning onshore and offshore wells.

It was also discovered that tube-wave signal propagation does not necessarily travel in a straight line between source-receiver well. If propagating reservoir is a curved channel, then guided wave also bends and follows the channel geometry in transit to the receiver well. In this sense, the propagating reservoir appears to act as a waveguide.

Due to the potential of long distance propagation of tube-wave signals in geophysical structures, it is anticipated that yet another application of tube-waves is to determine whether the source and receiver well are connected through the same reservoir compartment or channel (hence there would be a waveguide connection for the tube-waves to traverse).

It has been discovered that signal transmission of tube-waves through geological structures is sensitive to small changes in the reservoir properties even of limited spatial extent (or small areas). These sensitivities are common to both properties of low-velocity layers, as well as surrounding higher-velocity layers. Therefore it is expected that the transmitted tube-wave signal will also have sensitivity to changes for both for both low- and high-velocity reservoirs.

It was discovered that most of the currently used acoustic borehole sources generate strong tube waves which can be applied to the tube-wave methods disclosed herein. Also, the devices used for seismic stimulation may be used for that purpose, providing reliable, strong and repeatable tube-wave signal originating close to the reservoir zone. Such applications may make tube-wave monitoring practical in onshore well equipped with beam pumps at little cost. Furthermore, the signal does not go along the well thus eliminating one leg that is of no interest to reservoir and reduce uncertainty of the method. Still more, the signal is much stronger and therefore ameliorates the signal/noise problem.

It has also been discovered that in realistic formations, the cross-well tube-wave signal is very complex. To unravel the signal it is suggested that using a pre-monitoring survey containing a tube-wave suppressor: a device for minimizing the transmission of tube waves. Attaching the suppressor to the bottom of the recording array and lowering it down, will effectively cut all tube waves from below the packer, while preserve the ones above. Thus, running vertical profiles before production will allow defined time window sections responsible for each reservoir unit, and may be so correlated. This makes it possible to perform unambiguous interpretation of the signal at the monitoring stage. Without such pre-monitoring survey it is easy to imagine that sparse cross-well data would be impossible or exceedingly difficult to interpret.

It has further been discovered that two different signals may be used: one is tube wave in the tubing fluid, while another is a different tube wave in annulus fluid. One or the other or both can potentially be used as a tube-wave propagator depending on the well design.

It has been discovered by modeling that presence of any production (permanent or retrievable) packer greatly reduces tube-wave signal amplitudes passing through it, and therefore wells without packers are preferred for tube-wave applications. Additionally, the presence of a packer in a given well may determine whether annulus or tubing propagation paths will be the preferred signal path.

It has been further discovered that the absence of cement or poor cementation of wells does not kill the tube-wave signal whereas it does kill the conventional signal for Vertical Seismic Profiles or conventional cross-well. Therefore it extends tube-wave monitoring to areas where conventional techniques are not applicable.

Tube waves strongly attenuate in the presence of free gas in well fluid. Therefore, tube-wave technology does not immediately appear applicable to fields where gas is present in free form inside the tubing or annulus unless the tube-wave source is close to the perforated section.

It is possible to use a single-well reflection sounding with tube-waves in addition to cross-well sounding. Technically, one only needs to add several receivers in each source well. While there appears to be literature relating to tube-wave reflection logs, it appears that such literature is a qualitative scheme only and does not consider any monitoring applications.

It was discovered by modeling that signals reflect off the perforated intervals. This is consistent the theory that a tube-wave is a pressure wave transiting the fluid of a well bore, so a perforation in the well bore allows for direct hydraulic connection between the tube-wave and the medium with which to be coupled. The direct hydraulic connection may also be interpreted as a new signal source at the location(s) of the perforation(s).

It was discovered that the tube-wave signal varies depending on the permeability of the perforated formation immediately surrounding the well, or the gauge. Therefore, a single-well reflection sounding with tube-waves is a way to assess change in permeability and/or skin around the well during production, stimulation etc.

It was discovered that there is a dependency of the signal on the content of the perforation. Thus the signal may serve as diagnostics for estimating the perforation quality/content as well as changes in time.

It was discovered that a single well tube-wave survey can allow the differentiation between true reservoir changes, and changes related to source well bore only (and thus unrelated to reservoir).

APPENDIX A

Cylindrical Vector System

The cylindrical vector system used in this paper was previously introduced by Korneev and Johnson. Use of these vectors makes expressions for the Lamé equation especially simple since they thoroughly imply a special symmetry of the problem. The cylindrical vector system has the form $$Y_m^0 = Y_m e_3, \; Y_m^+ = Y_m e_1 - Y_m e_2, \; Y_m^- = Y_m e_1 + Y_m e_2, \quad (A1)$$

where $$Y_m = Y_m(\phi, z) \equiv \exp^{i(m\phi + hz)}, \; m=0, 1, 2, \ldots, \quad (A2)$$

and h is the projection of the wavenumber onto the OZ-axis, $i=\sqrt{-1}$. Vectors $e_1$, $e_2$, $e_3$ are the natural unit vectors of the cylindrical coordinate system $(\rho, \phi, z)$.

The cylindrical vectors of the system in (A1) are orthonormal at any point on a cylindrical surface. In the space of vector functions $\vec{f}(\phi), 0 \leq \phi \leq 2\pi$ defined on a circle $\rho$=const., $z$=const. the vectors (A1) satisfy the following orthogonality relations $$\int_0^{2\pi} (Y_m^\nu \cdot Y_{m_1}^{\nu_1}) d\varphi = c^\nu \delta_{mm_1} \delta_{\nu\nu_1}, \quad \nu = 0, +, - \quad (A3)$$

where $\delta_{kl}$ is equal to 1, when lower indexes are the same, and equal zero otherwise. The normalizing coefficients $c^\nu$ are $$c^0 = 1, \; c^+ = 2, \; c^- = 2 \quad (A4)$$

The system (A1) is complete in the sense of convergence in the mean for a Fourier series expansion. This means that any vector function $$\vec{u} = \vec{u}(\rho, \phi, z) = \vec{U}(\rho, \phi) \exp ihz \quad (A5)$$

can be represented in the form $$\vec{u}(\rho, \varphi, z) = \sum_\nu \sum_{m=0}^\infty f_m^\nu(\rho) Y_m^\nu(\varphi, z) \quad (A6)$$

The Lamé equation for a homogenous elastic medium is $$(\lambda + \mu) \nabla \nabla \cdot \vec{u} + \nabla \times \nabla \times \rho \omega^2 \vec{u} = 0 \quad (A7)$$

where the dependence of the displacement field $\vec{u}$ on time t is given by $\exp(i\omega t)$, where $\omega$ is the angular frequency. The parameters $\lambda$ and $\mu$ from (A7) are the Lamé constants, and $\rho$ is the density.

Substitution of the form (A6) into equation (A7) and use of the orthogonality property (A3) yields the differential Bessel equations for radial functions $f_m^\nu = f_m^\nu(\rho)$:

$$f_{mq}^0 = d_{mq}^0 Z_m(\alpha_q \rho), \; f_{mq}^+ = d_{mq}^+ Z_{m+1}(\alpha_q \rho), \; f_{mq}^- = d_{mq}^- Z_{m-1}(\alpha_q \rho), \; q = p, s, \quad (A8)$$

where $Z_k(x)$ is the cylindrical Bessel functions of order k, and $d_{mq}^\nu$ is an arbitrary constant, which can be determined by solving a corresponding boundary value problem. The parameter $\alpha_q$ from equation (A8) has two forms $$\alpha_p = \sqrt{\omega^2/v_p^2 - h^2}, \ldots \alpha_s = \sqrt{\omega^2/v_s^2 - h^2}, \quad (A9)$$

where $$v_p = \sqrt{(\lambda + 2\mu)/\rho}, \text{ and } v_s = \sqrt{\mu/\rho} \quad (A10)$$

are the propagation velocities of compressional ($\vec{u}_p$) and shear ($\vec{u}_s$) field components.

The simplicity of equations (A8) illustrates the main advantage of employing the cylindrical vectors of the form (A1). In all other systems the expressions for radial functions would also contain combinations of Bessel functions and their derivatives.

Fields $\vec{u}_p$ and $\vec{u}_s$ satisfy the equations $$\vec{\nabla} \times \vec{u}_p = 0, \; \vec{\nabla} \cdot \vec{u}_s = 0, \quad (A11)$$

which leads to the following conditions $$d_{mp}^+ = a_m, \; d_{mp}^- = -a_m, \; d_{mp}^0 = -2ih/\alpha_p \quad (A12)$$

$$d_{ms}^+ = b_m, \; d_{ms}^- = c_m, \; d_{ms}^0 = i(b_m - c_m)\alpha_s/h \quad (A13)$$

for the coefficients of equation (A8). Therefore, the fields $\vec{u}_p$ and $\vec{u}_s$ have the forms $$\vec{u}_p = \sum_{m=0}^\infty \vec{u}_{mp} = \sum_{m=0}^\infty a_m \left( -\frac{2ih}{\alpha_s} \frac{Z_m(\alpha_p \rho) Y_m^0 + Z_{m+1}(\alpha_p \rho)}{Y_m^+ - Z_{m-1}(\alpha_p \rho) Y_m^-} \right) \quad (A14)$$

$$\vec{u}_s = \sum_{m=0}^\infty \vec{u}_{ms} \quad (A15)$$

$$= \sum_{m=0}^\infty \left( \frac{i\alpha_s(b_m - c_m)}{h} \frac{Z_m(\alpha_s \rho) Y_m^0 + b_m Z_{m+1}(\alpha_s \rho)}{Y_m^+ + c_m Z_{m-1}(\alpha_s \rho) Y_m^-} \right)$$

For any index m=0, 1, 2, ... a correspondent component $\vec{u}$, $\nu$=p, s of equation (A14) or (A15) satisfies the equation of motion (A7), and represents an independently propagating harmonic of this index.

The expressions for the traction field on a surface $\rho$=const.

$$t_\rho(\vec{u}) = \lambda \nabla \cdot \vec{u} e_1 + \mu \left( 2 \frac{\partial \vec{u}}{\partial \rho} + e_1 \times \nabla \times \vec{u} \right) \quad (A16)$$

expressed through vectors (A1) have the form:

$$t_\rho(\vec{u}_{mp}) = a_m(-4i\mu h Z'_m Y_m^0 + \alpha_p(\lambda(1+h^2/\alpha_p^2)Z_m + 2\mu Z'_{m+1}) \quad (A17)$$
$$Y_m^+ + \alpha_p(\lambda(1+h^2/\alpha_p^2)Z_m - 2\mu Z'_{m-1})Y_m^-)$$

$$t_\rho(\vec{u}_{ms}) = ih\mu(b_m(Z_{m+1} + Z'_m\alpha_s^2/h^2) + c_m(Z_{m-1} - Z'_m\alpha_s^2/h^2)) \quad (A18)$$
$$Y_m^0 + i\alpha_s\mu(b_m(2Z'_{m+1} - Z_m/2) + c_m Z_m/2)Y_m^+ +$$
$$i\alpha_s\mu(b_m Z_m/2 + c_m(2Z'_{m-1} + Z_m/2))Y_m^-$$

In a cylindrical coordinate system, t is given by:

$$t_\rho(\vec{u}_{mp}) = a_m(2\alpha_p(\lambda(1+h^2/\alpha_p^2)Z_m + \mu(Z'_{m+1} - Z'_{m-1})) \quad (A19)$$
$$Y_m e_1 - 2i\alpha_p\mu(Z'_{m+1} + Z'_{m-1})Y_m e_2 - 4i\mu h Z'_m Y_m e_3)$$

$$t_\rho(\vec{u}_{ms}) = 2\alpha_s\mu(b_m Z'_{m+1} + c_m Z'_{m-1})Y_m e_1 + i\alpha_s\mu \quad (A20)$$
$$(b_m(Z_m - 2Z'_{m+1}) + c_m(Z_m + 2Z'_{m-1}))$$
$$Y_m e_2 + ih\mu(b_m(Z_{m+1} + Z'_m\alpha_s^2/h^2) +$$
$$c_m(Z_{m-1} - Z'_m\alpha_s^2/h^2))Y_m e_3$$

in unit vectors of cylindrical coordinate system. Arguments of the Bessel functions and their derivatives are equal to $\alpha_p\rho$ for equations (A17) and (A19) and are equal to $\alpha_s\rho$ for equation (A18) and (A20).

APPENDIX B

Boundary Value Problem

Consider a model consisting of N cylindrical layers characterized by constant parameters $\lambda_n$, $\mu_n$, $\rho_n$, n=1, ..., N and separated by interfaces r=$r_n$, n=1, ..., N−1. In each layer the elastic wave field can be expressed through equations (A17), (A18), where the radial functions depend on the parameters of each particular layer. In the fluid-bearing layers one has $\mu_n=0$ and $b_m=c_m=0$. For n=1, the function $Z_k^{(x)}$ must be finite for r=0 and $Z_k(x)=J_k(x)$. For the outermost medium, the wave field must satisfy the radiation condition at infinity r=∞, and $Z_k(x)=H_k^{(2)}(x)$. In the cases where the intermediate layers are bounded by two interfaces, any two independent solutions for the radial functions $Z_k(x)$ must be used, thereby doubling the number of coefficients $a_m$, $b_m$, $c_m$ for that layer. According to equation (A8) the arguments of the Bessel functions can be either real or imaginary, depending on the value of the vertical wave number h.

For fluid-solid interfaces the boundary conditions have the form $$\sum_{i=n}^{n+1} (\vec{u}^{(i)})_r = 0, \quad (A21)$$
$$\sum_{i=n}^{n+1} (t^{(i)})_r = 0,$$
$$(t^{(n+1)})_\varphi = 0,$$
$$(t^{(n+1)})_z = 0,$$
$$r = r_n,$$
$$n = 1, \ldots, N-1$$

while for solid-solid welded contact they are $$\sum_{i=n}^{n+1} \vec{u}^{(i)} = 0, \sum_{i=n}^{n+1} t^{(i)} = 0, r = r_n, n = 1, \ldots, N-1 \quad (A22)$$

Orthogonality of cylindrical vectors allows to reduce equations (A21) and (A22) to the separate forms $$\sum_{i=n}^{n+1} (\vec{u}_m^{(i)})_r = 0, \quad (A23)$$
$$\sum_{i=n}^{n+1} (t_m^{(i)})_r = 0,$$
$$(t_m^{(n+1)})_\varphi = 0,$$
$$(t_m^{(n+1)})_z = 0,$$
$$r = r_n,$$
$$n = 1, \ldots, N-1$$

and $$\sum_{i=n}^{n+1} \vec{u}_m^{(i)} = 0, \sum_{i=n}^{n+1} t_m^{(i)} = 0, r = r_n, n = 1, \ldots, N-1 \quad (A24)$$

for each harmonic m.

For a set of coefficients $a_m^{(n)}$, $b_m^{(n)}$, $c_m^{(n)}$ the conditions (A23) and (A24) give a homogeneous system of linear equations. Taking h to be $$h = \frac{\omega}{v_{tw}^{(m)}}, \quad (A25)$$

where $v_{tw}^{(m)}$ is the vertical phase velocity of the tube waves, the velocities of the propagating tube-waves can be found to be the roots of the equation $\Delta_m(v_{tw}^{(m)},\omega)=0$, where $\Delta_m(v_{tw}^{(m)},\omega)$ is the determinant of the above mentioned linear system.

CONCLUSION

All publications, patents, and patent applications mentioned in this specification are herein incorporated by reference to the same extent as if each individual publication or patent application were each specifically and individually indicated to be incorporated by reference.

The description given here, and best modes of operation of the invention, are not intended to limit the scope of the invention. Many modifications, alternative constructions, and equivalents may be employed without departing from the scope and spirit of the invention.

It is claimed:

1. A method for seismic imaging using tube-waves, the method comprising the steps of:
   a) transmitting an input tube-wave waveform down a transmitter borehole;
   b) coupling the input tube-wave waveform out of the transmitter borehole and into a geological reservoir portion of a volume of a geological mass substantially lateral to the borehole outside the transmitter borehole as a converted laterally propagating signal tube-wave waveform that propagates as a guided wave along the geological reservoir portion of the geological mass;

c) receiving the convened laterally propagating signal tube-wave waveform that propagates through the geological mass as a guided wave along the geological reservoir portion of the geological mass at a receiver borehole positioned through the geological reservoir portion of a volume of geological mass, and coupling the received converted laterally propagating signal tube-wave waveform into the receiver borehole as a received tube-wave waveform;

d) providing the receiving and coupling steps to produce the received tube-wave waveform after arrival of an initial P wave, said P wave traveling substantially directly through said volume of said geological mass in traditional seismic imaging; and e) digitally processing the received tube-wave waveform to produce a seismic image of said geological reservoir portion of geological mass disposed between said transmitter and receiver boreholes.

2. The method of claim 1 further comprising the step of:
a) controlling an oil or gas field disposed in said geological reservoir portion of geological mass based on said seismic image.

3. The method of claim 1 further comprising the step of:
a) performing a pre-monitoring survey with a tube-wave suppressor.

4. The method of claim 1 wherein the input tube-wave is transmitted as a tube-wave through a tubing fluid in the transmitter borehole.

5. The method of claim 1 wherein the input tube-wave is transmitted as a tube-wave through an annulus fluid in the transmitter borehole.

6. The method of claim 1:
a) wherein the transmitter borehole comprises several receivers.

7. An apparatus for seismic imaging using tube-waves that implements the methods of claim 1.

8. A method for seismic imaging using tube-waves, the method comprising the steps of:
a) transmitting an input tube-wave waveform down a transmitter borehole;
b) coupling the input tube-wave waveform out of the transmitter borehole and into a geological reservoir portion of a geological mass substantially lateral to the borehole outside the transmitter borehole as a converted laterally propagating signal tube-wave waveform that propagates as a guided wave along the geological reservoir portion of the geological mass;
c) receiving the converted laterally propagating signal tube-wave waveform that propagates through the geological mass as a guided wave along the geological reservoir portion of the geological mass at a receiver borehole positioned through the geological reservoir portion of a volume of geological mass, and coupling the received converted laterally propagating signal tube-wave waveform into the receiver borehole as a received tube-wave waveform;
d) providing the receiving and coupling steps to produce the received tube-wave waveform after arrival of an initial P wave, said P wave traveling substantially directly through said volume of said geological mass in traditional seismic imaging; and
e) providing digital means for processing the received tube-wave waveform to produce a seismic image of said geological reservoir portion of geological mass disposed between said transmitter and receiver boreholes.

9. The method of claim 8 further comprising the step of:
a) controlling an oil or gas field disposed in said volume of geological mass based on said seismic image of said geological reservoir portion of geological mass disposed between said transmitter and receiver boreholes.

10. The method of claim 8 further comprising the step of:
a) performing a pre-monitoring survey with a tube-wave suppressor.

11. The method of claim 8 wherein the input tube-wave is transmitted as a tube-wave through a tubing fluid in the transmitter borehole.

12. The method of claim 8 wherein the input tube-wave is transmitted as a tube-wave through an annulus fluid in the transmitter borehole.

13. The method of claim 8:
a) wherein the transmitter borehole comprises several receivers.

14. An apparatus for seismic imaging using tube-waves that implements the methods of claim 8.

15. An apparatus for seismic imaging using tube-waves, the apparatus comprising:
a) a transmitter borehole positioned through a geological reservoir portion of a volume of geological mass so an input tube-wave waveform can be transmitted down the transmitter borehole;
b) a first coupler that couples the input tube-wave waveform out of the transmitter borehole and into the geological reservoir portion of the geological mass outside the transmitter borehole as a converted laterally propagating signal tube-wave waveform that propagates as a guided wave along the geological reservoir portion of the geologic mass;
c) a receiver borehole positioned through the geological reservoir portion of a volume of geological mass that receives said converted laterally propagating signal tube-wave waveform that propagates through the geological reservoir portion of geological mass as a guided wave along the geological reservoir portion and a second coupler that couples the received converted laterally propagating signal tube-wave waveform into a received tube-wave waveform after arrival of an initial P wave, said P wave traveling substantially directly through said volume of said geological mass in traditional seismic imaging; and
d) digital means for processing the received tube-wave waveform to produce a seismic image of said geological reservoir portion of geological mass disposed between said transmitter and receiver boreholes.

* * * * *